United States Patent [19]

Langen et al.

[11] Patent Number: 4,663,804

[45] Date of Patent: * May 12, 1987

[54] DE-BONING MACHINE

[75] Inventors: Christianus P. Langen; Johannes C. Langen, both of Cuyk, Netherlands

[73] Assignee: Langen Research B.V., Cuyk, Netherlands

[ * ] Notice: The portion of the term of this patent subsequent to Mar. 25, 2003 has been disclaimed.

[21] Appl. No.: 794,418

[22] Filed: Nov. 4, 1985

Related U.S. Application Data

[63] Continuation of Ser. No. 462,395, Jan. 31, 1983, Pat. No. 4,577,369.

[30] Foreign Application Priority Data

Feb. 8, 1982 [NL] Netherlands ........................ 8200469

[51] Int. Cl.$^4$ ............................................. A22C 21/00
[52] U.S. Cl. ......................................... 17/1 G; 17/11; 17/46
[58] Field of Search .............................. 17/1 G, 46, 11

[56] References Cited

U.S. PATENT DOCUMENTS

| | | | |
|---|---|---|---|
| 2,897,536 | 8/1959 | Bergstrom et al. | 17/1 G |
| 4,137,605 | 2/1979 | van Rij et al. | 17/46 |
| 4,402,112 | 9/1983 | Gasbarro | 17/46 X |
| 4,577,369 | 3/1986 | Langen et al. | 17/46 |

Primary Examiner—Willie G. Abercrombie
Attorney, Agent, or Firm—Fetherstonhaugh & Co.

[57] ABSTRACT

A de-boning machine comprises a pair of dies which are adapted to close around a meat portion in which a bone is located such that the meat is displaced laterally from the bone in response to closing of the dies while the bone remains in tact. The dies preferably have opposite disposed de-boning faces in which a bone locating recess is formed. To reduce the likelihood of damage to the bone resulting from closing of the dies, the bone receiving recess is filled with a resiliently deformable material such as a food grade rubber. In order to separate the meat which has been laterally displaced from the bone, a cutter is provided laterally outwardly from the bone receiving recess, the cutter being operable upon final closing of the dies. In order to prevent overcompression of the resilient liner, a yieldable support is provided at at least the critical support areas, the yieldable support being adapted to yield to prevent excessive compressive loads being applied to the bone as a result of compression of the liners. The mechanism also includes a loading device which permits individual meat pieces to be loaded into the de-boning dies as required in use. The loading mechanism preferably includes a clamping mechanism which serves to clamp a bone which will be located outwardly from the dies during the boning operation. The mechanism being arranged to permit movement of the gripper relative to the de-boning dies to rip the bladebone from the meat which surrounds it and to separate the bladebone from the arm bone.

26 Claims, 19 Drawing Figures

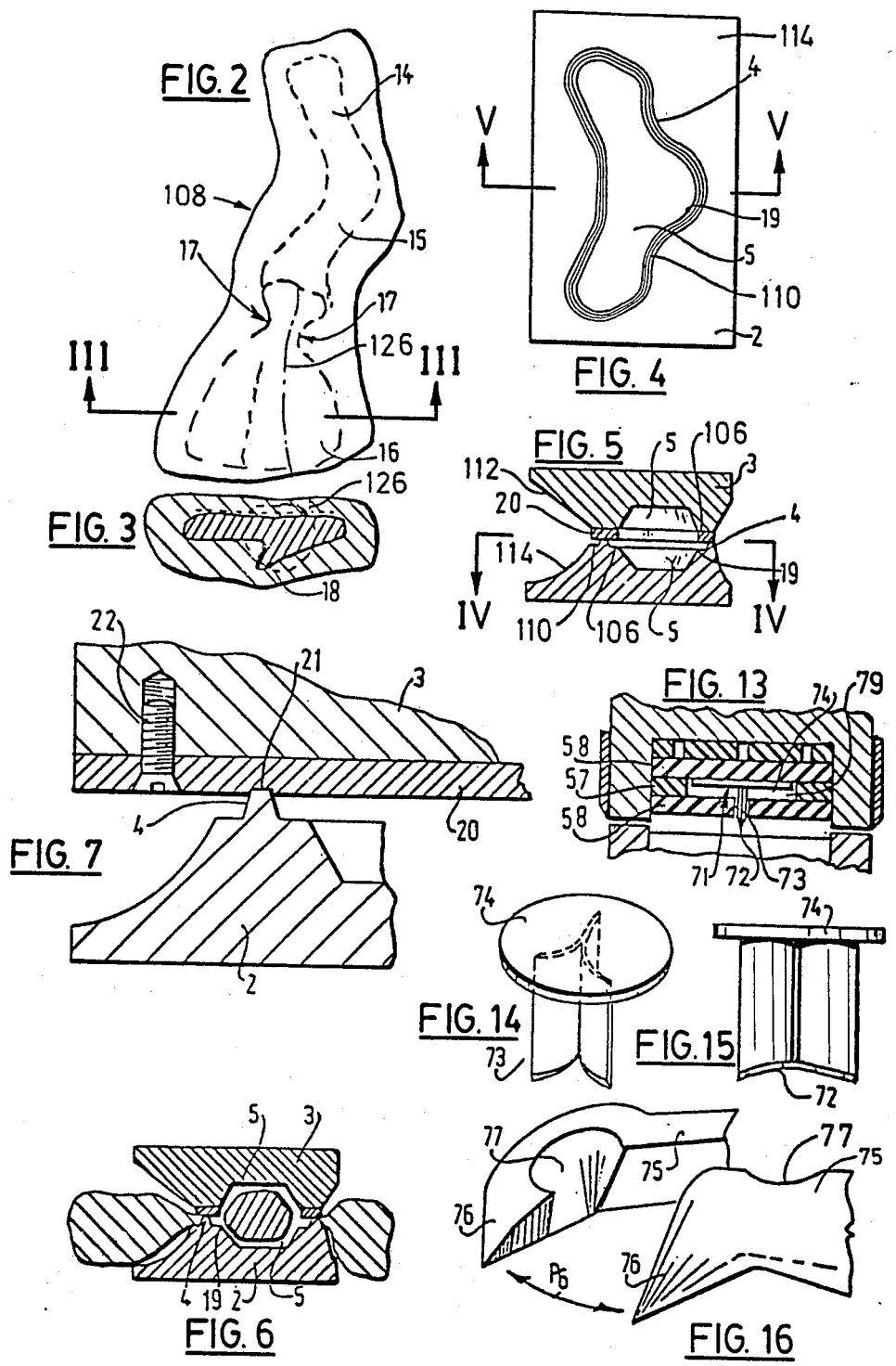

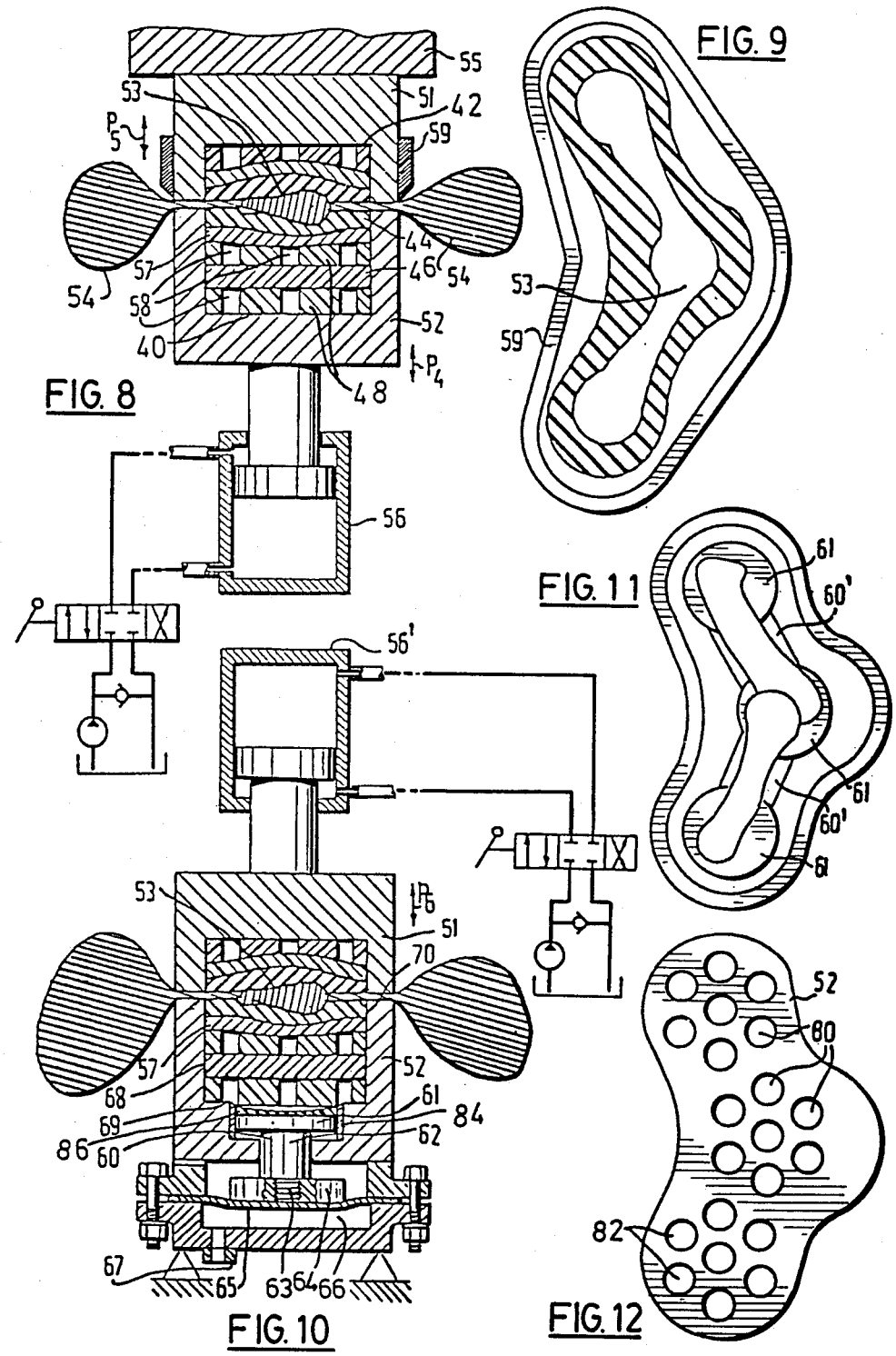

DE-BONING MACHINE

RELATED APPLICATIONS

This application is a continuation of application Ser. No. 462,395 filed Jan. 31, 1983, now U.S. Pat. No. 4,577,369 issued Mar. 25, 1986.

FIELD OF INVENTION

This invention relates to a method and apparatus for de-boning meat. In particular, this invention relates to a method and apparatus suitable for use in removing meat from pork or beef shoulders or ribs and legs of poultry and the like.

PRIOR ART

Considerable difficulty has been experienced for many years in attempting to de-bone meat and despite the fact that numerous attempts have been made to provide de-boner machines, the majority of the de-boning operations which are carried on today are manual.

In one mechanized de-boning process which is presently in use, the meat is removed from the bone under pressure and the bone is crushed under the meat removing pressure. The principal problem with this process is that difficulty is experienced in attempting to effectively separate the bone particles from the required meat.

In most jurisdictions, de-boned meat is subject to government inspection and if bone particles are detected in the meat, a complete batch of de-boned meat may be rejected as being unsuitable for subsequent processing with the result that it is necessary to check each individual de-boned product for bone particles and this can be a labour intensive, time consuming operation. Because of these difficulties, the industry continues to rely upon highly skilled individuals who perform a manual deboning operation. This is a costly and time consuming operation.

The method and apparatus of the present invention permits mechanical de-boning at high speed without requiring highly skilled operators and without damaging the bone during the removal of the meat.

SUMMARY OF INVENTION

Our de-boning machine preferably consists of a pair of complimentary dies having oppositely disposed de-boning faces a first of which has a continuous meat severing ridge projecting therefrom which is disposed directly opposite the other of said faces. The meat severing ridge extends about the perimeter of a recessed enclosure which has a shape substantially matching and slightly larger than the shape of the bone in the piece of meat. The continuous severing ridge has a first compression face formed thereon, and the second die has a laterally extending second compression face which is disposed directly opposite said first compression face in a face-to-face relationship therewith, while preserving the integrity of the bone and having cutter means arranged to extend about the perimeter of the bone supporting portions of the de-boning faces to cut the meat which has been laterally displaced away from the film and sinew which normally surrounds a bone, so as to separate the desired meat from the bone.

In order to reduce the likelihood of breaking or transferring the bone in use, the bone locating recess or recesses are preferably lined with the resiliently flexible liner in at least the areas of the recess arranged to underlie at least a portion of the selected bone most likely to be crushed or broken during closing.

In many applications, a resilient liner may be sufficient to prevent crushing of a bone during de-boning, however, in order to further ensure that the bone is not broken during de-boning, we prefer to provide a yieldable support in at least one of the de-boning recesses arranged to underlie at least the portions of the selected bone most likely to be crushed. The yieldable support is adapted to yield when the loads applied to close the dies approach a load likely to cause the bone to disintegrate. By providing a yieldable support, the de-boning machine is made more able to operate with selected bones of a wide range of thickness.

The sinew surrounding a bone are extremely difficult to cut. We are able to cut the sinew closely adjacent the perimeter of the bone locating recess by providing a raised cutter edge on a de-boning face of said dies and ensuring that the cutter edge is made from material which is sufficiently hard to enable it to be embedded in the de-boning face of the other die, in order to form a recess which cooperates with the ridge to apply shearing forces to the sinew which are to be cut in use.

Preferably, the distance between the edge of the bone locating recess and the side edges of the dies, is relatively small so that the meat which is forced off of the bone is discharged into an unrestricted space as soon as possible after it is removed from the bone so as to minimize the damage to the structure or texture of the meat with only a very minor portion of the meat being compressed to destruction during final closing of the dies at the point of cutting.

When it is necessary to de-bone a piece of meat such as a hog shoulder, in which the hock, picnic shoulder and bladebone are intricately connected, we provide a mechanism for gripping the flat bladebone and removing it while the remainder of the shoulder is retained by the de-boning dies.

We also provide a mechanism which facilitates the location of the meat bearing bones in the de-boning dies. This mechanism is preferably adapted to facilitate the removal of the bladebone.

To permit meat bearing bones of opposite hand to be processed by the de-boning machine of the present invention, the machine is adapted to receive the bones from opposite sides, thereof.

In use, during the closing of the moulds, the deformable liner will gradually nestle around the bone while pressing the surrounding meat portions laterally outwardly from the mould. The resiliently deformable material thus prevents crushing or comminugion of the bone. Preferably, the resiliently deformable material is in the form of one or more layers of elastic material such as rubber. A suitable elastic material is that identified by the trade mark TERMULEEN, which is manufactured by DuPont DeNemours. By providing the deformable material in layers, lateral displacement of one layer relative to the other is possible, thereby facilitating the displacement of the liner in order to accommodate irregular bone configurations.

In some applications, it may be desirable to include cutter blades embedded within the resiliently deformable material to cut or knick the surface of the meat as the dies close to facilitate the separation of the meat to allow it to discharge from opposite sides of the mould along a clearly defined shear line. In other applications, however, these knives may not be necessary and in some applications should be avoided in order to ensure that the knives do not damage the bone.

According to one aspect of the present invention there in a de-boning die set for deboning boned pieces of meat, having first and second die faces disposed opposite one another, on first and second dies respectively said first and second dies being mounted for movement of said first and second faces toward and away from one another, the improvement wherein; said first die has a continuous meat severing ridge projecting from sAid first face and disposed directly opposite said second face, said meat severing ridge extending about the perimeter of a recessed enclosure which has a shape substantially matching a slightly larger than the shape of the bone in the piece of meat, said continuous severing ridge having a first compression face formed thereon, and wherein, said second die has a laterally extending second compression face formed on said second face which is disposed directly opposite said first compression face in a face-to-face relationship therewith, such that when the first die element and the second die move towards one another said first compression face of said first die will move into a butting relationship with said second compression face of said second die and to apply a sufficient compressive force thereto at the abutting faces to disintegrate any meat, tendons and bone connective tissue located therebetween so as to separate the meat, tendons and bone connective tissue which are located outwardly from said enclosure from any meat, tendons and bone connective tissue which remains attached to the bone, while limiting the extent to which the the dies can close to substantially prevent breakage of the bone.

PREFERRED EMBODIMENT

The invention will be more clearly understood after reference to the following detailed specification read in conjunction with the drawings wherein:

FIG. 2 is a plan view of a meat bearing bone of a type which can be de-boned by the de-boning machine illustrated in FIG. 1.

FIG. 3 is a cross-sectional view of the meat bearing bone of FIG. 1 taken on the line 3—3 of FIG. 2.

FIG. 4 is a plan view of the de-boning die of FIG. 5 taken on line 5—5 of FIG. 5.

FIG. 5 is a cross-sectional view of a pair of de-boning dies arranged in a closed position taken on line 5—5 of FIG. 4.

FIG. 6 is a sectional view similar to FIG. 5 illustrating the meat being removed from the bone.

FIG. 7 is an enlarged sectional view of a portion of the closed dies of FIG. 5 illustrating the cutting edge in more detail.

FIG. 8 is a longitudinal cross-sectional view of a de-boning mechanism constructed in accordance with an embodiment of the present invention.

FIG. 9 is a plan view of the lower die of FIG. 8.

FIG. 10 is a longitudinal cross-sectional view of a de-boning machine constructed in accordance with a further embodiment of the present invention.

FIG. 11 is a plan view of the lower die of FIG. 10 showing the position of a bone after removal of the meat.

FIG. 12 is a plan view of a lower mould constructed in accordance with a further embodiment of the present invention.

FIG. 13 is a cross-sectional view of a die constructed in accordance with a further embodiment of the invention.

FIG. 14 is a pictorial view taken from above of a cutter element for use in the die of FIG. 13.

FIG. 15 is a side-view of the cutter element of FIG. 14.

FIG. 16 is an enlarged detailed view of a portion of the gripper elements of the support mechanism illustrated in FIG. 1.

Figure 1:
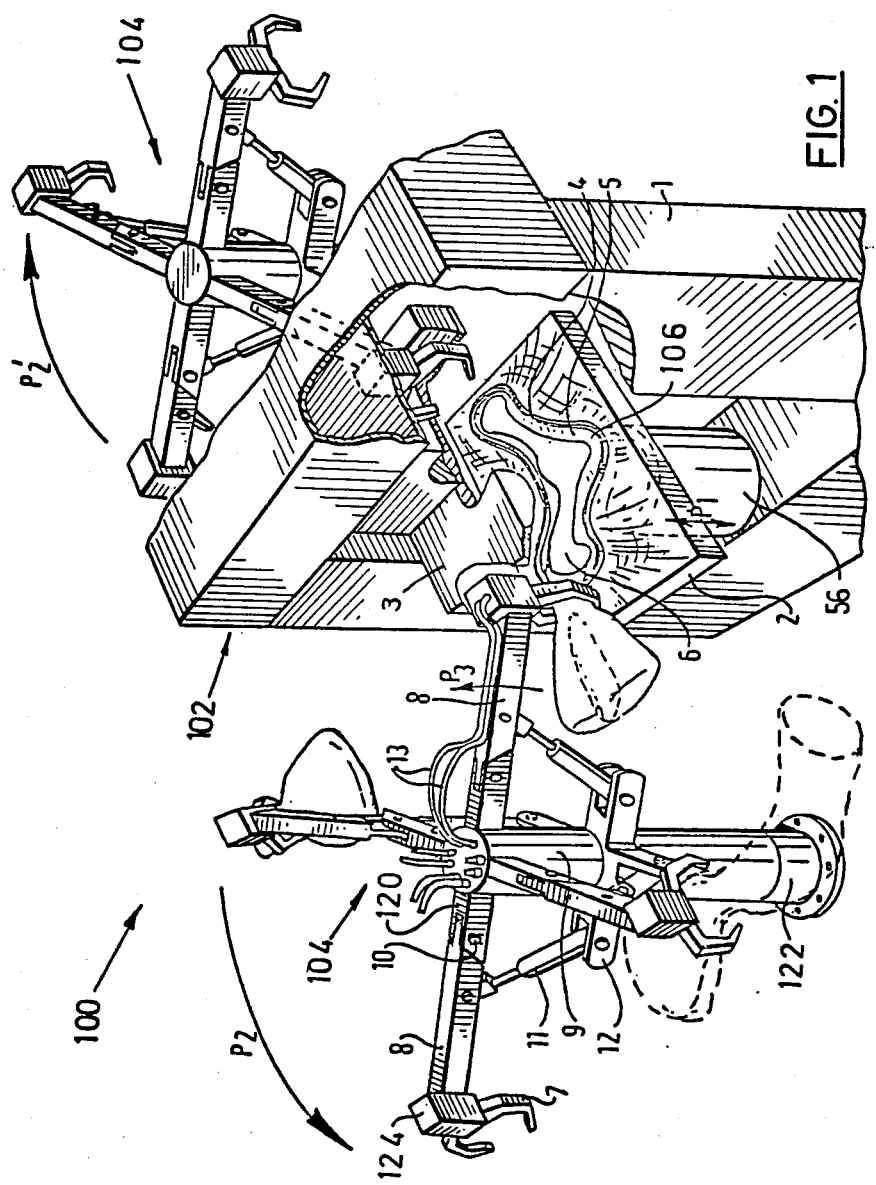
FIG. 1 is a partially sectioned pictorial view of a de-boning machine constructed in accordance with the embodiment of the present invention.
Figure 17:
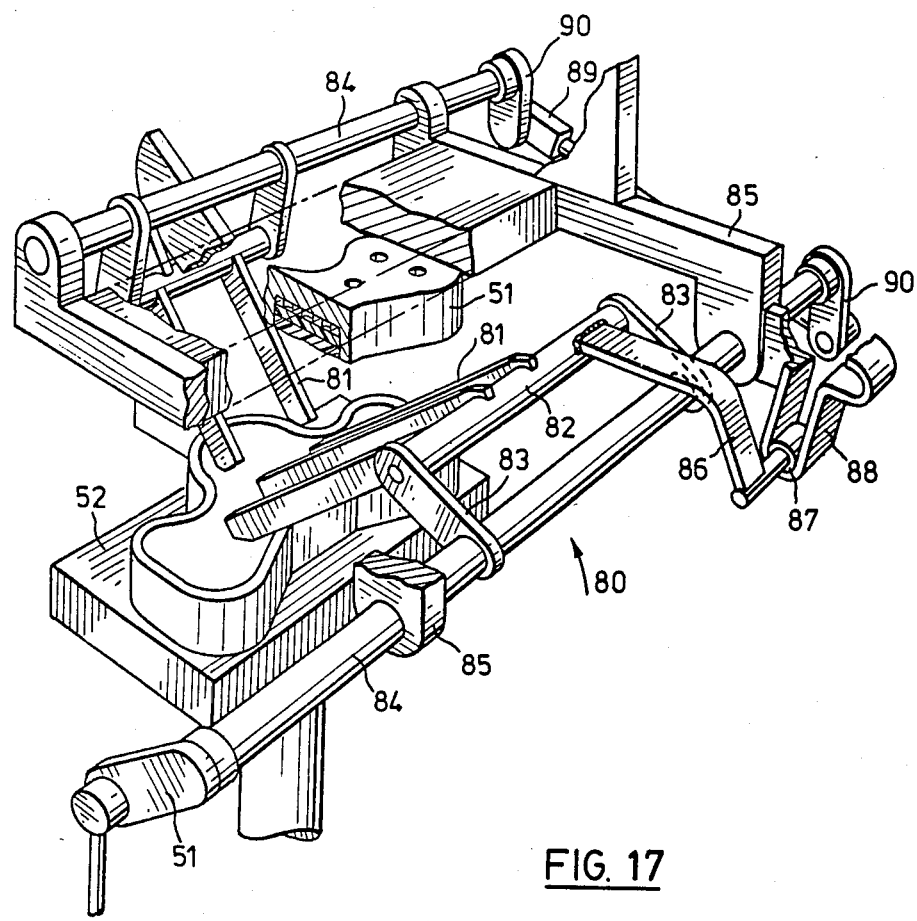
FIG. 17 is a perspective plan view of a further embodiment of the invention, including centering means.
Figure 18:
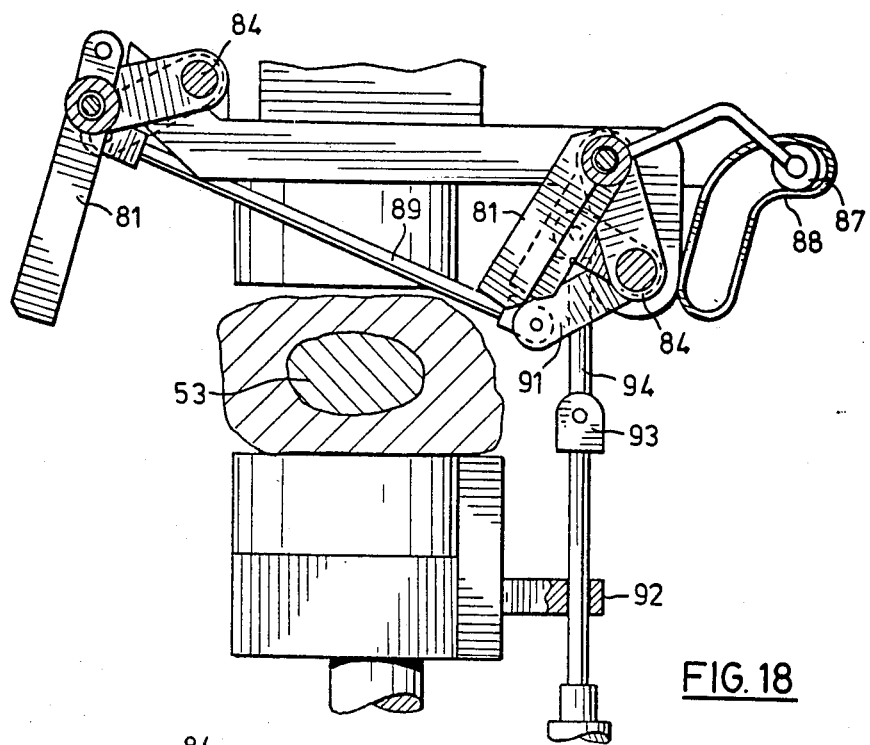
Figure 19:
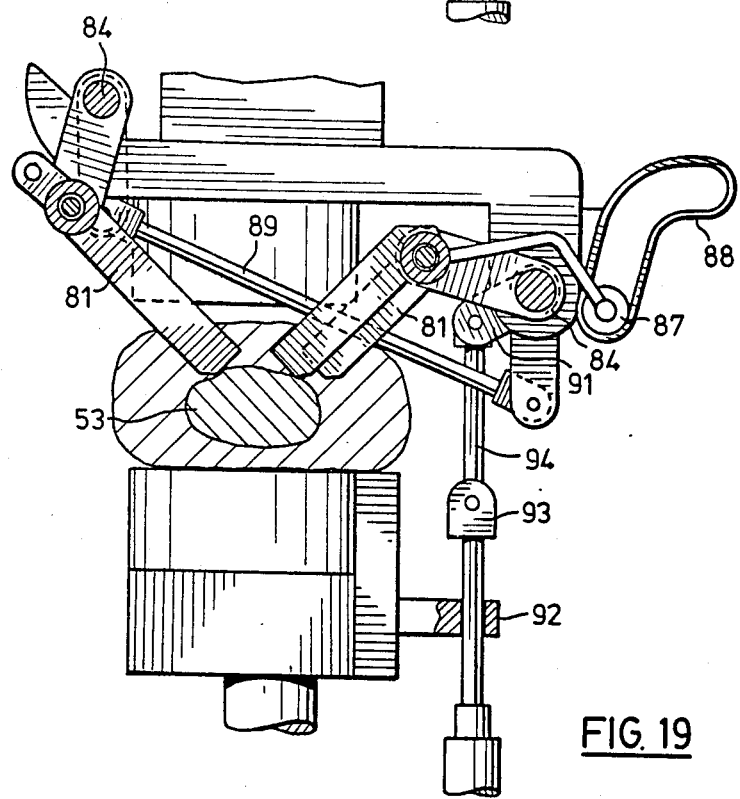

FIGS. 18 and 19 both are elevational side views of the embodiment according to FIG. 17, each showing the centering means in a retracted and protruding position of said centering means respectively.

With reference to the drawings, the reference numeral 100 refers generally to a de-boning mechanism which comprises a de-boning machine generally identified by the reference numeral 102 and a pair of meat loading devices generally identified by the reference numeral 104. The de-boning machine 102 is in the form of press and consists of a frame 1. Preferably, the press is designed to apply high pressure loads of the order of 200 tons, such loads being frequently required in order to ensure that mean sinews can be severed upon closing of the dies.

De-boning is achieved between dies 2 and 3. The upper die 3 is rigidly mounted on the press and the lower die 2 is mounted on a ram 56 which is adapted to move the lower die 2 up and down in the direction of the arrow P1. The lower die 2 has a de-boning face 106 in which a bone locating recess 5 is formed. A raised cutting edge extends about the perimeter of the de-boning face 106 laterally outwardly from the recess 5. The upper die 3 also has a de-boning face 106 in which a bone locating recess 5 is located. The recesses 5 of the dies 2 and 3 are shaped to generally conform the shape of a selected bone.

FIGS. 2 and 3 of the drawings illustrate a typical pork shoulder which is generally identified by the reference numeral 108 and which is a typical selected meat product which requires de-boning. The shoulder 10 includes fore shank bones 14 which extend within the hock portion, an armbone 15 which extends within the picknick portion and a bladebone 16 which extends within the butt portion. As shown in FIG. 3 of the drawings, the bladebone 16 is generally flat and has a ridge portion 18. During the de-boning operation, the selected meat portion is preferably arranged with the ridge portion 18 extending downwardly as will be described hereafter.

The recess 5 which is formed in the dies 2 and 3 is shaped to generally correspond to the configuration of the fore shank bones 14 and armbones 15 although it will be understood that this recess may be arranged to correspond to the shape of any other bone which is to be removed by the de-boning apparatus of the present invention. The recess 5 has an edge 19 extending about the periphery thereof and a narrow end portion 110 extending laterally outwardly from the edge of the recess 5. The faces 112 and 114 of the dies 2 and 3 which extend away from the edge of the land 110 diverge rapidly with respect to one another so as to provide a space into which meat may be deflected or extruded during closing of the dies.

As previously indicated, considerable difficulty has been experienced in attempting to sever meat sinew and the film which normally surrounds a bone. We have found that an effective cutting device is provided by forming a raised cutting edge 4 extending about the perimeter of the recess 5 in the lower die and a complimentary recess 21 extending about a face plate 20 which is mounted on the upper die 3 as shown in FIG. 7. The raised cutting edge 4 may have a truncated U-shaped configuration as illustrated in FIG. 7 or it may be a sharp V-shaped edge. A deformable face plate 20 of a material which is significantly more ductile than that of the cutting edge 4 is located on the upper die 3 and in use the lower die 2 is pressed against the upper die 3 to form a recess 21 in the plate 20. The recess 21 will then cooperate with the cutting edge 4 to shear sinews extending thereacross, thereby severing the sinews in use.

In using the de-boning dies of the type described in FIGS. 1 and 4 to 7, the meat bearing bone is positioned with the bone located within the recess 5 of the lower die and the press is closed. As the press closes, the bone is effectively punched from the meat because the recesses 5 are proportioned to form a cavity which is only slightly smaller than the bone. The cavity is, as previously indicated, shaped to ensure that the die will close before the bone is broken or crushed.

While we have been able to de-bone meat using dies constructed in accordance with the embodiment of the invention illustrated in FIGS. 1 and 4 to 7, we have found that the likelihood of damaging the bone can be greatly reduced by introducing a resiliently deformable liner into each mould cavity. The resiliently deformable liner is preferably in the form of a pad of elastic material such as a food grade rubber. As shown in FIG. 8 of the drawings, the recess 40 which is formed in the lower die 52 and the recess 42 formed in the upper die 51, are merely rectangular shaped troughs and it will be understood that the troughs extend over substantially the full length of the upper and lower dies 52 so that the end walls which are not shown are of substantially the same thickness as the side walls. In the embodiment illustrated in FIG. 8, a plurality of layers of deformable material are located in each recess 40 and 42. The layers which are located in the recess 40 include a first layer 44, a second layer 57 and a third layer 46, all of which are continuous and made from a resilient elastic material. Two additional layers 48 are provided, each of which is formed with the plurality of passages 58 which open vertically therethrough in the direction of movement of the dies. The passages 58 are located at a plurality of spaced intervals throughout the width as shown in FIG. 8 and throughout the length of each perforated layer 48. These passages 58 serve to facilitate relative movement between adjacent layers so that the layers of resilient material can deform readily to the contour of the bone 53. The resiliently deformable insert which is located within the upper die 51 also consists of a plurality of layers including a perforated layer which again serve to conform to the configuration of the bone 53. Preferably, although not essentially, small shallow recesses are formed in the outer faces of the upper and lower most layers of the inserts of the lower and upper dies respectively, so as to center the bone.

It will be noted that the perforations 58 which are formed in the resilient layers, do not extend to the side edges of the perforated layers with the result that a column is formed about the side edges of each recesses which has a compression resistance which is greater than that of the remainder of the perforated area. That is to say, the side edges of the flexible inserts are preferably more rigid than the main body of the flexible inserts with the result that the meat which is being extruded when the dies approach the closed position, is driven out of the die cavity rather than being retained within the die cavity because of the compression of the resilient inserts.

In the embodiment illustrated in FIG. 8, a cutter blade 59 is mounted on the upper die 51 and is slidable in the direction of the arrows P5, so as to move downwardly to sever the meat which is extruded beyond the die in order to remove the meat as required in use. The cutter blade 59 extends about the entire periphery of the upper die.

In use, the lower die 52 is raised and lowered by activating the ram 56 by means of a power source through a valve mechanism which is diagramatically illustrated to ensure that the ram 56 is a double acting ram which may be raised and lowered as required. Initially, the lower die 52 is lowered and the meat piece within which the bone is located is positioned on the upper surface of the upper most layer of resilient material. The ram 56 is then activated to raise the lower die toward the upper die. As the two dies come together, the resilient inserts will initially compress the meat toward the bone and deflect the meat outwardly away from the bone. This reaction will continue until the dies have closed to the position shown in FIG. 8 wherein substantially all of the meat is removed from the bone. Thereafter, the cutter blades 59 are activated to sever the meat 58 which is spaced outwardly from the dies from the remaining material which is connected to the bone which is generally the sinew and film which surrounds the bone which is undesirable as a content in the meat for subsequent processing. Thus it will be seen that the bone can be substantially stripped of meat without damaging the bone. Because the bone does not break and its integrity is not destroyed, no bone particles are discharged into the meat 54.

The embodiment of the de-boning machine illustrated in FIG. 10 of the drawings differs from that of FIG. 9 merely in that the upper die 51 is mounted on the ram 56 prime and is the moveable die element. In addition, a plurlity of pistonassemblies generally identified by the reference numerals 60 are mounted in the base of the lower die 52. Preferably, a piston assembly 60 is provided to underlie each enlarged bone portion. The piston assembly 60 comprise a piston head 61 mounted on a shaft 62 which has a threaded end 63 mounted in a support plate 64. The support plate 64 rests on a diaphragm 65 which is clamped to extend across a pressure chamber 66. A fluid inlet 67 communicates with the chamber 65. A contoured liner 82 is mounted on the upper face of each piston and a sleeve 84 surrounds the wall of each piston to facilitate movement of the piston. A step or ledge 69 extends from the edge of each sleeve 84 to the side of the cavity of the lower mould. This ledge serves to ensure that the side edges of the flexible inserts will not yield to the same extent as the perforated portions of the liners and to the same extent as the portions of the liners which are supported by the pistons 61. This rigidity at the edge of the insert is important for the reason previously discussed in that it ensures that while the main body portion of the inserts is sufficiently resilient to deform about the thicker portions of the bone, the side edges will not readily deform to trap meat inwardly thereof before the dies are closed.

In the embodiment of the device illustrated in FIG. 10, the dies 51 and 52 will close as previously described. During lowering of the upper die 51, the resilient inserts will initially be deformed by contact with the thicker portions of the meat surrounding the thicker portions of the bone and continued closing will cause the resilient inserts to nestle around the bone. Because of the wide range of thicknesses which the bones may have which are to be de-boned, and because of the difference in thickness at different positions along the length of the bone, the extent to which it would be necessary to compress the resilient material may vary considerably, with the result that the forces applied to the bone may be substantially greater at the thicker portions thereof than they are at the thinner portions. In order to ensure that excessive forces are not applied at the thicker portions of the bone, the pistons 61 are positioned to underlie these thicker portions and the pistons 61 will yield to prevent excessive forces being applied so that the maximum force which can be applied by the resilient inserts can be determined by controlling the pressure in the pressure chamber 66. This mechanism permits extremely high pressures to be applied to the mould halves on closing to ensure that the sinews are severed in the manner previously described with reference to FIGS. 4 to 7 of the drawings. In this respect, it will be understood that the cutting edge 21 may be provided on the upper edge 52 with a complimentary recess being provided in the lower edge of the die 51.

FIGS. 11 and 12 illustrate further embodiments of the present invention. In FIG. 11, three circular pistons 61 are illustrated and a pair of complimentary support pads 60 prime are shown extending between the pistons 61. It will be understood that the support pads 60 prime may be supported by the diaphragm 65 so as to yield as required.

FIG. 12 illustrates a further embodiment wherein a plurality of circular passages 80 are formed in the base of the die 52 and a pin 82 is slidably mounted in each passage 80. Again the pins 82 will rest on a diaphragm 65 so as to yield when subjected to excessive pressures resulting from closing of the die.

A further embodiment of the invention is illustrated in FIGS. 13, 14 and 15 of the drawings wherein a cutter member 71 is mounted in a chamber 79 formed in the resilient layer 57 and enclosed by resilient layers 58. The cutter 74 has a blade portion 73 which has a sharpened edge 72. A suitable cutter member is illustrated in FIGS. 13 and 14 of the drawings. The cutting edge 72 is arranged to project through the outward most layer 58 so as to bear against the meat as the dies close to form an incision in the meat which facilitates the removal of the meat from the bone. The shape of the cutter blade is selected so as to provide the most effective form of incision, depending upon the type of meat which is being processed.

One or more such cutter members may be located within the upper or lower dies as required in use. The cutter blades should be strategically located and proportioned to ensure that the cutting edge is not driven against the bone during de-boning to an extent sufficient to damage the bone. As previously indicated, it is important to ensure that the bone is not broken or crushed during de-boning.

Referring again to FIG. 1 of the drawings, it will be seen that the loading mechanism 104 comprises clamps 7 which are mounted on arms 8. The arms 8 are pivotally mounted by means of pivot pins 10 on shoulders 120 which project outwardly from a turret 9. The turret 9 is mounted for rotation about a vertical axis on a support post 122. Each arm 8 is connected to one end of a ram 11, the other end of which is connected to a bracket 12 which is mounted on the turret 9. The ram 11 is connected to a high-pressure fluid (knotch) and is operable to project radially from its associated shoulder 120 when the ram 11 is in the contracted position. Extension of the ram 11 causes its associated arm 8 to pivot upwardly about its pivotal connection 10. The operating mechanism for the jaws 7 which is housed within the compartment 124, is connected to a high-pressure fluid by means of conduits 13.

To permit de-boning of meat pieces of opposite hand, two loading mechanisms 104 are provided and are arranged one on either side of the de-boning machine so that meat pieces can be positioned by operation of either one of the loading mechanisms.

In use, when de-boning a pork shoulder of the type illustrated in FIGS. 2 and 3 of the drawings, an incision 126 is initially made for the purposes of exposing the flat upper face of the bladebone 16. The meat is then gripped by the clamps 7 such that the portions 17 of reduced thickness of the bladebone is located in the knotch 77 (FIG. 16) which is located at the distal end of each of the arms 75 of the clamps 7. It will be noted that the arms 75 have pointed ends 76 which facilitate puncturing of the meat during closing of the clamps 7. It will also be noted that the recesses 77 are proportioned to ensure that while the clamps 7 secure the neck portion 17 of the bladebone 16, the bone is not broken by the clamping mechanism. It will be understood that the recesses 77 are arranged and proportioned to permit the bladebone 16 to be self-aligning during initial loading and during subsequent removal of the bladebone.

In use, after a portion of meat is clamped by the clamp 7, the turret 9 is rotated in the direction of the arrow P2 to position the meat with the portion which is to be de-boned resting in the recess of the lower die member as shown in FIG. 5. The ram 56 is then actuated to move the dies to the closed position. When the dies have been sufficiently closed to secure the fore shank and arm bones, the ram 11 is extended and this action causes the gripper member 7 to pull the bladebone away from its connection to the arm bone and rips the bladebone from its surrounding meat. Thus, the bladebone is removed from its surrounding meat without damage to the bladebone. Consequently, the meat previously surrounding the bladebone does not contain any bone chips or splinters and its texture is not destroyed. Thereafter, the movement of the ram 56 causes the dies 2 and 3 to close to remove meat from the bone which is located therebetween in the manner previously described.

From the foregoing, it will be apparent that various modifications of this structure are possible. For example, it will be understood that while the loading turrets may be used to advantage in a number of applications, there are also applications in which manually loading of the dies may be advantageous than mechanical loading. It will also be apparent that various shoots or slides may be provided adjacent the dies to facilitate the discharge of the meat and the separated bones into appropriate reciprocals.

In a further modification of the apparatus described above, the dies may be adapted to remove the meat from a pork shoulder including the meat surrounding the bladebone. That is to say the entire meat portion illustrated in FIG. 2 of the drawings, may be positioned between the dies and the meat removed by compression between the resilient members of the dies rather than having the bladebone ripped from its surrounding meat as previously described. A die having a recess such as that illustrated in FIG. 4 of the drawings may be suitable for this purpose.

In the embodiment according to FIGS. 17, 18 and 19 the cutting device is provided with centering means 80, which serves to locate the bone in the meat piece exactly in the center line of the mould, for instance, according to the position of the bone as shown in FIG. 11.

The centering means are formed like arms 81, which are parallel to each other, whereas one end of which are fastened to a rod 82 pivotably arranged in between a pair of levers 83 secured to a driving shaft 84 Said driving shaft is journalled in a frame part 85 secured to the upper mould 51 of the boning device.

The rod 82 is further provided with a bracket 86, the free end of which is provided with a roller 87. The roller is guided in a cam-track 88, part of the frame 85.

At the opposite side of the mould 51 a similar structure is provided in order to create a pair of opposite arms 81, the free ends of which are pointed to the lower mould 52.

Those groups of centering arms 81 are movablé simultaneously into the space in between the upper and lower mould and are to be protected therefrom. The simultaneous movement is achieved by a linkage 89 pivotably journalled unto crank arms 90 on both driving shafts 84 of the opposite centering arms.

One of the shafts 84 is provided with a crank arm 91 to which any suitable driving means can be connected.

The working of the centering means as described hereabove is as follows:

Assuming that the centering arms 81 are being in the first position as shown in FIGS. 17 and 19, said arms are protruding into the space between the lower and upper mould 52 and 51 respectively. Assuming further that a piece of meat is placed upon the lower mould 52, the centering arms 81 will be stuck into the piece of meat, so that the end faces of the arms 81 will urge the bone 53 in the correct position with respect to the cavity in the mould. The centering action of the arms 81 will be ameliorated by the particular position of the end faces including a certain angle with respect to each other.

When raising the lower mould 52 further the pressing action of the arms 81 upon the bone will be heightened too. The pressing action will continue up to the moment when a bracket 92 fastened to the mould 52 will reach a stop member 93 of a driving rod 94, which is fastened to the crank 91 of the driving shaft 84. At that moment any further raising of the lower mould 52 will push the rod 94 upwards and so turn the shaft 84 in clockwise direction as the pair of levers 83 accordingly. The arms 81 will be retracted so, whereas the retracting movement is guided by the roller 87 in the cam-track 88.

The opposite arms 81 at the left side in FIG. 19 are also retracted, whilst the driving shaft 84 is turned clockwise also by means of the linkage 89.

The arms 81 will be brought in the retracted second position, according to FIG. 18, so the lower mould 52 can reach the upper mould undisturbed by the arms 81. For cutting the piece of meat the moulds are in the position of for instance FIG. 8.

When removing the piece of meat and the bone cutted out, another piece of meat may be inserted as soon as the lower mould 52 is again in the position of FIG. 18. Thereupon, the rod 94 can be lowered by a suitable driving means, for instance a hydraulic cylinder 95, so bringing the arms 81 into the first position of FIG. 19.

Within the scope of the invention, it will be clear that the protruding arms may have any suitable form, wherein it is just necessary that the end faces thereof are positioned so that the urging action is directed to the lower mould 52 in order to have the bone centered accurately.

From the foregoing, it will be apparent that the present invention provides a simple and efficient mechanism which facilitates the removal of meat from bones while preventing undesirable breaking of the bones.

I claim:

1. In a de-boning die set for deboning boned pieces of meat, having first and second die faces disposed opposite one another, on first and second dies respectively, said first and second dies being mounted for movement of said first and second faces toward and away from one another, the improvement wherein;

said first die has a continuous meat severing ridge projecting from said first face and disposed directly opposite said second face, said meat severing ridge extending about the perimeter of a recessed enclosure which has a shape substantially matching and slightly larger than the shape of the bone in the piece of meat, said continuous severing ridge having a first compression face formed thereon, and wherein, said second die has laterally extending second compression face formed on said second face which is disposed directly opposite said first compression face in a face-to-face relationship therewith, such that when the first die element and the second die move towards one another said first compression face of said first die will move into a butting relationship with said second compression face of said second die and to apply a sufficient compressive force thereto at the abutting faces to disintegrate any meat, tendons and bone connective tissue located therebetween so as to separate the meat, tendons and bone connective tissue, which is located outwardly of said enclosure, from any meat, tendons and bone connective tissue which remains attached to the bone, while limiting the extent to which the the dies can close to substantially prevent breakage of the bone.

2. A de-boning dies set as claimed in claim 1, wherein said first compression face includes a flat laterally extending face at the top of its ridge, said flat laterally extending face being disposed directly opposite and extending parallel to said second compression face.

3. A de-boning dies set as claimed in claim 1, wherein the second die is made from a material which is permanently deformable with respect to the severing ridge of the first die to form a complimentary severing channel in said second die which precisely matches that of the first die to facilitate the cutting of sinews and the like.

4. A de-boning dies set as claimed in claim 1, wherein said complimentary severing channel is formed in a replaceable face plate which is releasably mounted on said second die, and disposed opposite the severing ridge of the first die so as to be removed as required in use when a new complimentary severing channel is required on the second die.

5. A de-boning dies set as claimed in claim 1, wherein at least one of the said dies has a recess formed therein, the contour line of which, when viewed in the direction of movement of the dies, is spaced inwardly from said severing ridge, the capacity of said recess substantially corresponding to the volume of a selected bone portion.

6. A de-boning dies set for deboning pieces of meat having a bone structure which includes relatively flat bone portions such as shoulder pieces and as claimed in claim 1, further comprising a clamping member for clamping said flat bone portion said clamping member being mounted for movement toward and away from said first and second dies to remove the flat bone from the meat in response to movement of the clamp away from the dies.

7. A de-boning dies set as claimed in claim 6, wherein the clamping member comprises two opposing arms, at least one of which has a recess formed therein which is adapted to accomodate a portion of said flat bone, said recess being proportioned to provide a clearance fit about said portion of the flat bone.

8. A de-boning dies set as claimed in claim 6, wherein at least two clamping members are mounted on a movable carrier which is adapted to be indexed to locate successive clamping members adjacent said dies to provide a support for the boned meat at the dies.

9. A de-boning dies set as claimed in claim 1, characterized in that the contour followed by said severing ridge is symmetrical shape so as to permit loading of right or left hand boned pieces of meat.

10. A de-boning dies set as claimed in claim 1, wherein at least one of said first or second dies having a cavity which formed inwardly of said severing ridge which is proportioned to receive a bone portion which is to be separated from the meat, and a deformable mass is located in said cavity, said deformable mass being spaced inwardly from the severing ridge so as to retain the bone portion in a spaced relationship with respect to the severing ridge.

11. A de-boning dies set as claimed in claim 10, wherein said deformable mass is in the form of one or more layers of elastic material which is resiliently deformable to conform to the configuration of bones of differing proportions.

12. A de-boning dies set as claimed in claim 11, wherein one or more of said layers are perforated to facilitate irregular deformation of the deformable mass to accomodate variations in bone thickness in the boned meat.

13. A de-boning dies set as claimed in claim 10, wherein said cavity has a bottom wall underlying said deformable mass, at least one portion of said bottom wall being in the form of a movable platform which is mounted for movement relative to the bottom wall so as to yield under the influence of a predetermined load to prevent the application of a bone crushing load to the bone portion during movement of the dies to their closed position.

14. A de-boning dies set as claimed in claim 13, wherein a plurality of pins are slidably mounted in said bottom wall, each pin having an upper face forming one of said movable platforms.

15. A de-boning dies set as claimed in claim 13, wherein each of said movable platforms is supported by a diaphragm of a chamber filled with a high-pressure fluid so as to permit independent movement of said movable platforms as required in use.

16. A de-boning dies set as claimed in claim 10, wherein said cavity has a stepped inner wall which forms a ledge which extends about the perimiter of the cavity and serves to rigidify the perimeter of the deformable mass.

17. A de-boning dies set as claimed in claim 10, wherein at least one cutting blade is located in the deformable mass so as to cut the meat in a direction toward the bone after it has been engaged by a deformable mass to a sufficient extent to be retained within said cavity.

18. A de-boning dies set as claimed in claim 17, wherein the cutting blade has a longitudinally elongated cutting edge, said cutting blade having an inner end embedded in said deformable mass so as to deform said deformable mass when the movement of the cutting blade is arrested by contact with the bone during closing of the dies.

19. A device for de-boning boned pieces of meat, comprising:
a frame,
a first die arranged in the frame, said first die having a first die face which has a continuous meat severing ridge formed thereon, said meat severing ridge projecting from said first die face and extending about the perimeter of a recessed enclosure which has a shape substantially matching and slightly larger than the shape of the bone in the piece of meat, said continuous severing ridge having a first compression face formed thereon,
a second die arranged in said frame, said second die having a second face disposed opposite the first die element, said second die face having a laterally extending second compression face formed thereon which is disposed directly opposite said first compression face in a face-to-face relationship therewith,
and driving means for moving the first die element and the second die towards one another to bring said first compression face of said first die into butting relationship with said second compression face of said second die and to apply a sufficient compressive force thereto at the abutting faces to disintegrate any meat, tendons and bone connective tissue located therebetween so as to separate the meat, tendons and bone connective tissue, which is located outwardly outwardly of said enclosure, from any meat, tendons and bone connective tissue which remains attached to the bone.

20. A device as claimed in claim 19, wherein the second die is made from a material which is permanently deformable with respect to said severing ridge of the first die to form a complimentary channel in said second die which precisely mates with said severing ridge to facilitate the compression of the meat and sinue to disintergation.

21. A device as claimed in claim 20, wherein said complimentary channel is formed in a replaceable face plate which is releasably mounted on said second die, and disposed opposite the cutting ridge of the first die so as to be removed as required in use when a new complimentary severing ridge is required on the second die.

22. A device as claimed in claim 19, wherein that at least one of the said dies has a recess formed therein, the contour line of which, when viewed in the direction of movement of the dies, is spaced inwardly from said severing ridge, the capacity of said recess substantially corresponding to the volume of a selected bone portion.

23. A device for de-boning boned pieces of meat comprising;
first and second dies having oppositely disposed bone supporting faces each formed with a bone locating cavity formed therein,
closure means for moving said first and second dies relative to one another between an open and a closed position,
first and second resiliently deformable means located in said first and second cavities,
meat severing means on said dies, said meat severing means extending about said the perimeter of said cavities and being operable to sever any meat located therebetween when said dies are closed,
at least one movable piston mounted in said second die and underlying said second resiliently deformable mass,
a pressure chamber disposed below said movable piston, said pressure chamber having a movable wall supporting said piston whereby the pressure in said chamber supports said piston such that said piston is movable relative to said dies independently of said closure means.

24. In a de-boning dies set for deboning boned pieces of meat, having first and second dies disposed opposite, and mounted for movement toward and away from, one another, the improvement wherein;
said first die has a first continuous meat penetrating ridge projecting therefrom to form a perimeter wall of an enclosure which has a shape substantially matching and slightly larger than the shape of the bone in the piece of meat, said first meat penetrating ridge having a height equal at least half the thickness of the bone in said pieces of meat, and a continuous severing ridge formed on said first meat penetrating ridge and extending about the perimeter of said enclosure, said severing ridge having a first compression face formed thereon, and
said second die has a second continuous meat penetrating ridge projecting therefrom to form a perimeter wall of an enclosure which has a shape substantially matching and slightly larger than the shape of the bone in the piece of meat, said meat penetrating ridge having equal at least half the thickness of the bone in said pieces of meat, a laterally extending compression face formed on said second meat penetrating ridge which is disposed directly opposite said severing ridge in a face-to-face relationship therewith, such that when the first die element and the second die move towards one another the meat penetrating ridges will act as oppositly disposed punches which will penetrate the meat in close proximity to the bone to effectively punch the bone out of ther meat and thereafter said first severing ridge of said first die will move into a butting relationship with said compression face of said second die and to apply a sufficient compressive force thereto at the abutting faces to disintegrate any meat, tendons and bone connective tissue located therebetween so as to separate the meat which is located laterally outwardly of the severing ridge from that which remains attached to the bone.

25. In a de-boning dies set for deboning boned pieces of meat, having first and second dies disposed opposite, and mounted for movement toward and away from, one another, the improvement wherein;
said first die has a continuous meat severing ridge projecting therefrom which extends about the perimeter of an enclosure which has a shape substantially matching and slightly larger than the shape of the bone in the piece of meat, said continuous severing ridge having a first compression face formed thereon, and
said second die has a laterally extending second compression face formed thereon which is disposed directly opposite said first compression face in a face-to-face relationship therewith, such that when the first die element and the second die move towards one another said first compression face of said first die will move into a butting relationship with said second compression face of said second die and to apply a sufficient compressive force thereto at the abutting faces to disintegrate any meat, tendons and bone connective tissue located therebetween so as to separate the meat, tendons and bone connective tissue, which is located outwardly of said enclosure, from any meat, tendons and bone connective tissue which remains attached to the bone,
said second die being made from a material which is permanently deformable with respect to the severing ridge of the first die to form a complimentary severing channel in said second die which precisely matches that of the first die to facilitate the cutting of sinues and the like.

26. A device for de-boning boned pieces of meat, comprising;
a frame,
a first die arranged in the frame and having a continousous meat severing ridge projecting therefrom which extends about the perimeter of an enclosure which has a shape substantially matching and slightly larger than the shape of the bone in the piece of meat, said continuous severing ridge having a first compression face formed thereon,
a second die arranged in said frame opposite the first die element, said second die having a laterally extending second compression face formed thereon which is disposed directly
opposite said first compression face in a face-to-face relationship therewith,
and driving means for moving the first die element and the second die towards one another to bring said first compression face of said first die into butting relationship with said second compression face of said second die and to apply a sufficient compressive force thereto at the abutting faces to disintegrate any meat, tendons and bone connective tissue located therebetween so as to separate the meat, tendons and bone connective tissue, which is located outwardly of said enclosure, from any meat, tendons and bone connective tissue which remains attached to the bone,
at least one of the said dies having a recess formed therein, the contour line of which, when viewed in the direction of movement of the dies, is spaced inwardly from said severing ridge, the capacity of said recess substantially corresponding to the volume of a selected bone portion.

* * * * *